(12) United States Patent
Seong et al.

(10) Patent No.: US 8,822,872 B2
(45) Date of Patent: Sep. 2, 2014

(54) ELECTRODE WIRE FOR ELECTRO-DISCHARGE MACHINING AND METHOD FOR MANUFACTURING THE SAME

(76) Inventors: Ki-Chul Seong, Pyeongtaek-si (KR); Hyun-Soo Seong, Pyeongtaek-si (KR); Hyun-Kook Seong, Pyeongtaek-si (KR)

( * ) Notice: Subject to any disclaimer, the term of this patent is extended or adjusted under 35 U.S.C. 154(b) by 124 days.

(21) Appl. No.: 13/442,615

(22) Filed: Apr. 9, 2012

(65) Prior Publication Data

US 2012/0273465 A1 Nov. 1, 2012

(30) Foreign Application Priority Data

Apr. 29, 2011 (KR) ........................ 10-2011-0040757

(51) Int. Cl.
| | |
|---|---|
| *B23H 1/04* | (2006.01) |
| *B23H 7/00* | (2006.01) |
| *B32B 9/00* | (2006.01) |
| *B23B 3/26* | (2006.01) |
| *B23B 3/12* | (2006.01) |
| *B23B 7/00* | (2006.01) |
| *B23B 5/14* | (2006.01) |
| *D02G 3/00* | (2006.01) |
| *B32B 17/00* | (2006.01) |
| *B23H 7/08* | (2006.01) |

(52) U.S. Cl.
CPC ........................................ *B23H 7/08* (2013.01)
USPC .................... 219/69.15; 219/69.12; 428/40.1; 428/40.9; 428/41.1; 428/304.4; 428/343; 427/117; 427/118; 427/120; 427/123; 427/171; 427/376.8; 427/383.7; 427/434.6; 427/436; 427/437

(58) Field of Classification Search
USPC ........ 219/69.12, 69.15; 428/40.1, 304.4, 343; 427/117, 118, 120, 123, 171, 376.8, 427/383.7, 434.6, 436, 437
See application file for complete search history.

(56) References Cited

U.S. PATENT DOCUMENTS

| | | | | | |
|---|---|---|---|---|---|
| 4,233,486 | A | * | 11/1980 | Inoue ........................ | 219/69.12 |
| 4,341,939 | A | * | 7/1982 | Briffod et al. .............. | 219/69.12 |
| 4,414,458 | A | * | 11/1983 | Nomura ..................... | 219/69.12 |
| 4,686,153 | A | * | 8/1987 | Tominaga et al. ........... | 428/610 |
| 4,977,303 | A | * | 12/1990 | Briffod ...................... | 219/69.12 |

(Continued)

OTHER PUBLICATIONS

Wikipedia, search keywords: "List of Copper Alloys", Mechanical properties of common copper alloys.*

(Continued)

*Primary Examiner* — Dana Ross
*Assistant Examiner* — Gyounghyun Bae
(74) *Attorney, Agent, or Firm* — Birch, Stewart, Kolasch & Birch, LLP

(57) ABSTRACT

Disclosed are an electrode wire for electro-discharge machining and a method for manufacturing the same. The electrode wire includes a core wire including a first metal including copper, a first alloy layer formed at a boundary region between the core wire and a second metal plated on an outer surface of the core wire due to mutual diffusion between the core wire and the second metal, and a second alloy layer formed due to diffusion of the first metal to the second metal. A core wire material is erupted onto a surface of the electrode wire for electro-discharge machining, which includes the core wire, the first alloy layer, and the second alloy layer, along cracks appearing on the second alloy layer, so that a plurality of grains are formed on the surface of the electrode wire.

15 Claims, 10 Drawing Sheets

(56) References Cited

U.S. PATENT DOCUMENTS

| | | | | |
|---|---|---|---|---|
| 5,281,787 A * | 1/1994 | Arakawa | | 219/69.12 |
| 5,340,958 A * | 8/1994 | Okazaki et al. | | 219/69.12 |
| 5,945,010 A * | 8/1999 | Tomalin | | 219/69.12 |
| 6,306,523 B1 * | 10/2001 | Seong | | 428/613 |
| 6,362,447 B2 * | 3/2002 | Shimojima et al. | | 219/69.12 |
| 6,492,036 B2 * | 12/2002 | Seong | | 428/613 |
| 7,723,635 B2 * | 5/2010 | Shin | | 219/69.15 |
| 7,868,265 B2 * | 1/2011 | Kawamoto et al. | | 219/69.12 |
| 8,067,689 B2 * | 11/2011 | Tomalin | | 174/36 |
| 8,338,735 B2 * | 12/2012 | Ly et al. | | 219/69.12 |
| 8,445,807 B2 * | 5/2013 | Hashizume et al. | | 219/69.12 |
| 2001/0014411 A1 * | 8/2001 | Seong | | 428/613 |
| 2001/0050269 A1 * | 12/2001 | Shimojima et al. | | 219/69.12 |
| 2002/0092831 A1 * | 7/2002 | Seong | | 219/69.12 |
| 2006/0138091 A1 * | 6/2006 | Lee | | 219/69.12 |
| 2006/0219666 A1 * | 10/2006 | Shin | | 219/69.12 |
| 2008/0061038 A1 * | 3/2008 | Blanc et al. | | 219/69.12 |
| 2009/0025959 A1 * | 1/2009 | Tomalin | | 174/126.2 |
| 2010/0163529 A1 * | 7/2010 | Sato et al. | | 219/69.15 |

OTHER PUBLICATIONS

Wikipedia, search keywords: "Specific Strength", Specific Tensitle Strength of Various Materials.*

* cited by examiner

ELECTRODE WIRE FOR ELECTRO-DISCHARGE MACHINING AND METHOD FOR MANUFACTURING THE SAME

BACKGROUND OF THE INVENTION

1. Field of the Invention

The present invention relates to an electrode wire for electro-discharge machining and a method for manufacturing the same. In more particular, the present invention relates to an electrode wire for electro-discharge machining and a method for manufacturing the same, capable of reducing machining particles generated when an electrode wire is subject to the electro-discharge machining and improving the machining speed and the surface roughness of a workpiece.

2. Description of the Related Art

In general, as shown in FIG. 1, according to an electro-discharge machining scheme employing an electrode wire 2, the electrode wire 2 is inserted into a workpiece 1 through a start hole 7 which has been previously perforated through the workpiece 1. A high-frequency voltage is applied between the electrode wire 2 and an inner wall surface of the start hole 7 while the electrode wire 2 is being continuously inserted into the workpiece 1 in the perforation direction of the start hole 7, thereby generating arc between the electrode wire 2 and the inner wall surface of the start hole 7, so that the workpiece 1 is melted. Then, melts are removed by using a machining liquid and the instantaneous vaporization power between the electrode wire 2 and the workpiece 1, so that the workpiece 1 can be machined in a desired shape.

According to the electro-discharge machining principle, an electro-discharge machine includes a power supply, a wire transferring unit, a workpiece transferring unit, and a machining liquid circulating unit.

In general, as indicated by the arrow in FIG. 1, the workpiece transferring unit moves perpendicularly to the electrode wire 2. After the electrode wire 2 continuously reeled out of a supply reel 3 is hang on guide rollers 5 and 5' provided at both end portions of the workpiece 1, the electrode wire 2 is wound around a winding reel 4.

In this case, a high frequency-voltage is applied between the workpiece 1 and the electrode wire 2 through the power supply 6 to perform a cutting machining process, and deionized water is supplied to a machining region as a machining liquid in order to discharge heat emitted in the cutting machining process. The efficiency of the electro-discharge machining, especially, the machining speed, significantly depends on machining parameters such as the feeding speed of the machining liquid, machining current density, and the shape and frequency of the machining voltage, and the efficiency of the electro-discharge machining can be improved by adjusting the machining parameters.

Pure copper has been used in a conventional technology since the pure copper has high electrical conductivity and facilities a fine wire process due to a high elongation property. However, since a pure copper line represents a low tensile strength in the electro-discharge machining, the pure copper may be easily disconnected. In addition, a high tensile strength cannot be applied to the copper line, so that vibration of the electrode wire 2 cannot be controlled, thereby resulting in an inferior machining accuracy.

In addition, the copper wire represents a relatively slower machining speed. Therefore, a high strength wire such as a molybdenum wire or a tungsten wire has been used for a special application of high machining precision. In addition, a brass electrode wire, such as a brass wire including copper and zinc in a weight ratio of 65%:35%, has been developed for the general purpose of wire electro-discharge machining.

When comparing with a pure copper wire, the brass electrode wire has a tensile strength which is at least twice greater than the tensile strength of the copper wire, and more improves discharge stability and instantaneous vaporization power due to zinc which is an alloy component of the brass electrode wire. Accordingly, when comparing with the pure copper wire, the brass electrode wire improves the machining speed and the machining precision.

In addition, as the electro-discharge machining scheme has been extensively used, the demand for the improvement of a tensile strength and the machining speed is increased. Accordingly, an advanced brass electrode wire has been developed by adding a small amount of Al, Si, and the like to the brass electrode wire, so that the tensile strength and the machining speed of the brass electrode wire can be improved.

Meanwhile, as zinc content is increased in a brass alloy, the machining speed may be increased. However, if the zinc content is more than 40 weight % in the brass alloy, a weak brittle phase β is formed, so that a drawing process may be difficult when a fine wire is formed.

In order to solve the above problem, the inventor of the present invention has suggested the structure of an electrode wire in Korea Patent Registration No. 10-518727, in which the electrode wire includes a core wire including a first metal including copper, an alloy layer, which is formed from an outer portion of the core wire toward the center of the core wire by diffusing the component of a second metal to the first metal through the mutual diffusion reaction between the first and second metals at the boundary region of the core wire, an alloy plated layer, which is formed on the core wire by diffusing the component of the first metal to the second metal through the mutual diffusion reaction between the first and second metals, and a plating layer, which is formed on the alloy plated layer and includes the second metal having a vaporization temperature lower than that of the first metal constituting the core wire. In this case, the alloy plated layer is formed on the core wire through the mutual diffusion reaction between the first and second metals, so that the alloy plated layer represents the highest hardness and the lowest elongate percentage among the layers. In addition, the alloy plated layer and the plating layer have cracks appearing perpendicularly to the longitudinal direction of the electrode wire.

In addition, the inventor of the present invention has suggested the structure of an electrode wire including a core wire including a first metal including copper, an alloy layer, which is formed from an outer portion of the core wire toward the center of the core wire by diffusing the component of a second metal to the first metal through the mutual diffusion reaction between the first and second metals at the boundary region of the core wire, and an alloy plated layer, which is formed on the core wire by diffusing the component of the first metal to the second metal through the mutual diffusion reaction between the first and second metals. In this case, the alloy plated layer is formed on the core wire through the mutual diffusion reaction between the first metal and the second metal having a vaporization temperature lower than that of the first metal to represent the hardness higher than that of the core wire and the elongation percentage lower than that of the core wire. The alloy plated layer has cracks appearing perpendicularly to the longitudinal direction of the electrode wire. The first metal includes copper, brass, or a copper alloy, and the second metal includes zinc, aluminum, tin, or the alloy thereof.

Further, the inventor of the present invention has suggested a method for manufacturing an electrode wire for electro-discharge machining in Korea Patent Registration No. 10-518731, in which the method includes preparing an intermediate wire rode, which serves as a core wire, includes a first metal including copper, and has a first diameter, forming an alloy layer, which represents the hardness higher than those of the first and second metals and the elongation percentage lower than those of the first and second metals, on an outer portion of the core wire through the mutual diffusion reaction between the first and second metals by passing the core wire including the first metal through a plating bath containing the second metal melted therein and having a vaporization temperature lower than that of the first metal and forming a plating layer including the second metal on the alloy layer, allowing cracks to appear on the alloy layer and the plating layer due to the higher hardness and the lower elongation percentage of the alloy layer by drawing the intermediate wire rod having the alloy and plating layers so that the intermediate wire rod has a second diameter, and stabilizing a mechanical characteristic of a fine wire by performing a heat treatment process with respect to the fine wire having the cracks.

In order to form the alloy and plating layers on the core wire, the core wire is passed through the plating bath for one second to ten seconds at a temperature of about 400° C. to about 500° C. The first metal includes copper, brass, or a copper alloy, and the second metal includes zinc, aluminum, tin or the alloy thereof.

In addition, the inventor of the present invention has suggested a method for manufacturing an electrode wire for electro-discharge machining in Korea Patent Registration No. 10-518733, in which the method includes preparing an intermediate wire rode, which serves as a core wire, includes a first metal including copper, and has a first diameter, forming an alloy plated layer, which represents the hardness higher than those of the first and second metals and the elongation percentage lower than those of the first and second metals, on an outer portion of the core wire through the mutual diffusion reaction between the first and second metals by passing the core wire including the first metal through a plating bath containing the second metal melted therein and having a vaporization temperature lower than that of the first metal, allowing cracks to appear on the alloy plated layer due to the higher hardness and the lower elongation percentage of the alloy layer by drawing the intermediate wire rod having the alloy plated layer so that the intermediate wire rod has a second diameter, and stabilizing a mechanical characteristic of a fine wire by performing a heat treatment process with respect to the fine wire having the cracks.

According to the related arts, an electrode wire having an alloy layer including copper-zinc grain fragments is formed through the mutual diffusion reaction with a core wire metal including copper performed due to the melted zinc and applied heat, so that the machining speed can be improved. However, when performing an elongation process for a brass core wire representing 510 N, the brass core wire is strengthened, so that the brass core wire may be easily fragmented, thereby producing a great amount of machining particles in electro-discharge machining.

CITED REFERENCES

Patent 1: Korea Patent Registration No. 10-518727
Patent 2: Korea Patent Registration No. 10-518731
Patent 3: Korea Patent Registration No. 10-518733

SUMMARY OF THE INVENTION

Accordingly, the present invention has been made keeping in mind the above problems occurring in the prior art, and an object of the present invention is to manufacture a core wire representing the higher elongation percentage and the lower tensile strength by adjusting a heat treatment temperature in a dip-plating process, in detail, by increasing the heat treatment temperature.

Another object of the present invention is to provide an electrode wire for electro-discharge machining, capable of significantly reducing machining particles while maintaining the machining speed by pushing the manufactured core wire representing the lower tensile strength, that is, the softer brass core wire onto a zinc-copper alloy surface along cracks of the alloy layer due to the pressure generated in an elongation process as if lava, thereby surrounding or covering zinc-copper alloy grain fragments.

Still another object of the present invention is to make grain fragments having lengths, which are at least twice greater than widths thereof, by pushing the softer core wire material onto a surface of an electrode wire along cracks when performing elongation and drawing processes, in which the cracks are previously made on the core wire material constituting the electrode wire for electro-discharge machining in a direction perpendicular to a longitudinal direction of the core wire material by forcibly curving or twisting the softer brass core wire plated with zinc in at least one of up, down, left, and right directions before the elongation and drawing processes are performed.

Still yet another object of the present invention is to provide an electrode wire for electro-discharge machining, capable of increasing the surface roughness of a workpiece and preventing machining particles of the electrode wire while rapidly maintaining the machining speed when performing the electro-discharge machining by forming grain fragments having lengths, which are at least twice greater than widths thereof, on the surface of the electrode wire in a direction perpendicular to a longitudinal direction of a core wire material.

Still yet another object of the present invention is to provide an eco-friendly electrode wire capable of improving the precision in electro-discharge machining.

To accomplish these objects, according to one aspect of the present invention, there is provided an electrode wire for electro-discharge machining including a core wire including a first metal including copper, a first alloy layer formed at a boundary region between the core wire and a second metal plated on an outer surface of the core wire due to mutual diffusion between the core wire and the second metal, and a second alloy layer formed at an outer portion of the first alloy layer due to diffusion of the first metal to the second metal. A core wire material is erupted onto a surface of the electrode wire for electro-discharge machining, which includes at least the core wire, the first alloy layer, and the second alloy layer, along cracks appearing on the second alloy layer, so that a plurality of grains are formed on the surface of the electrode wire. The grain including at least the core wire material and a second alloy material is distributed onto the surface of the electrode wire for electro-discharge machining.

In addition, the core wire material is erupted together with a first alloy material, so that the grain including the core wire material, the first alloy material, and the second alloy material is distributed on the surface of the electrode wire for electro-discharge machining.

In addition, the first metal includes one selected from the group consisting of copper, brass, and a copper alloy, and the second metal includes one selected from the group consisting of zinc, aluminum, tin, and an alloy thereof.

In addition, the grain including at least the second alloy material is surrounded by the core wire material.

In addition, the grain including the core wire material is arranged in a direction substantially perpendicular to a longitudinal direction of the electrode wire for electro-discharge machining, and has a length twice or ten times greater than a width of the grain.

According to one aspect of the present invention, there is provided A method of manufacturing an electrode wire for electro-discharge machining including preparing an intermediate wire rod, which includes a first metal and has a first diameter, as a core wire, plating the core wire with a second metal, performing a heat treatment process to make the plated core wire representing tensile strength of about 500 N/mm2 or less and elongation percentage of 5 or more and to form a first alloy layer in at least a boundary region between the core wire and the second metal due to mutual diffusion between the core wire and the second metal and to form a second alloy layer on an outer portion of the first alloy layer through diffusion of the first metal to the second metal, and forming a grain including at least a core wire material and a second alloy material on a surface of the electrode wire for electro-discharge machining by erupting the core wire material through a crack appearing on the second alloy layer when performing a fine wire process of making the electrode wire for electro-discharge machining which includes the first alloy layer, the second alloy layer, and the core wire and has a second diameter.

In addition, in the forming of the grain on the surface of the electrode wire for electro-discharge machining, the core wire material is erupted together with a first alloy material, so that the grain including the core wire material, the first alloy material, and the second alloy material is formed.

In addition, the core wire is plated with the second metal through one of an electroplating scheme, a dip-plating scheme, and a chemical plating scheme.

In addition, the core wire is plated with the second metal through the dip-plating scheme, and the heat treatment process is performed by dipping the core wire into a plating bath having an entrance temperature of about 550° C. to about 700° C. and an exit temperature of about 420° C. to about 500° C. within time of about 1 second to about 10 seconds.

In addition, before the electrode wire for electro-discharge machining is drawn to have a second diameter in the forming of the grain, the electrode wire for electro-discharge machining is forcibly twisted in at least one of up, down, left, and right directions.

In addition, the first metal may include pure copper, or brass including 63 weight % to 67 weight % of copper and 33 weight % to 37 weight % of zinc. The second metal includes one selected from the group consisting of zinc, aluminum, tin, and an alloy thereof.

In particular, according to the present invention, if the dip-plating process is employed, the core wire including the first metal and having the first diameter is plated with the second metal at a predetermined thickness. In order to allow the plated core wire to represent the tensile strength of about 500 N/mm2 or less and the elongation percentage of about 5% or more, the plating process may be performed again in a state that the temperature of the plating bath having the same size is increased, or the dipping and passing time of the core wire in the plating bath may be prolonged. Accordingly, the winding speed of the intermediate wire rod passed through the plating bath may be controlled.

For example, if the winding speed of the intermediate wire rod is quickly increased, the length or the temperature of the plating bath must be increased.

The conditions related to the winding speed, the length of the plating bath, and the temperature form the first alloy layer of about 1 μm to about 3 μm and the second alloy layer of about 3 μm to about 10 μm on the core wire plated with zinc, that is, the intermediate wire rod having the first diameter, so that the intermediate wire rod can represent the tensile strength of about 500 N/mm2 or less and the elongation percentage of about 5% or more.

In this case, the first alloy layer is formed from the outer portion of the core wire to the center of the core wire by diffusing the second metallic component to the first metal due to the mutual diffusion reaction between the first and second metals at the boundary region of the core intermediate wire rod. The second alloy layer having the vaporization temperature lower than that of the first metal of the core wire and higher than that of the second metal is formed by diffusing the first metallic component to the second metal due to the mutual diffusion reaction between the first and second metals at the boundary region of the first alloy layer.

According to the method for manufacturing the electrode wire, in order to stabilize the mechanical characteristic of the electrode wire, a heat treatment process is additionally performed with respect to the electrode wire for electro-discharge machining that has been manufactured as a fine wire having the second diameter.

As described above, according to the electrode wire for electro-discharge machining of the present invention, a material constituting a core wire is erupted onto the surface of the electrode wire along cracks formed in an alloy layer of the electrode wire as if lava, so that a plurality of grains are formed on the surface of the electrode wire. In addition, the grains of the core wire material formed on the surface of the electrode wire for electro-discharge machining surround at least grains of a second alloy layer, thereby preventing broken grains from getting out of the surface, so that machining particles can be reduced when the electro-discharge machining is performed. In addition, the efficiency of the electro-discharge machining can be improved, so that the machining speed can be increased.

If the generation of the machining particles is prevented in the electro-discharge machining, discharge can be prevented from being performed again due to the machining particles when performing the electro-discharge machining, and the machining particles can be prevented from being filled in a diamond guide dice hole through which the electrode wire is passed.

In particular, according to the present invention, since the grains are arranged with lengths, which are about two times to about ten times greater than the widths thereof, in a direction substantially perpendicular to a longitudinal direction of the electrode wire, the surface roughness of a workpiece and the machining speed for the workpiece can be maximized.

The machining speed for the workpiece is improved. This is because the softer core wire is erupted onto the surface of the electrode wire along cracks and exposed, so that grains are formed to surround the second alloy layer, thereby reducing machining particles derived from the electrode wire and allowing the second alloy layer having a vaporization temperature lower than that of the first metal to increase the explosion power of thermal energy in discharge.

Meanwhile, since the electrode wire for electro-discharge machining has a uniform circumferential surface without protrusions, a bad influence is not exerted on the precision of the electro-discharge machining. In addition, the cooling efficiency can be improved when performing the electro-discharge machining due to cracks formed around the grains, and fragments resulting from the electro-discharge machining can be easily removed due to the lower vaporization temperature, thereby obtaining superior detergency effect and improving the surface roughness of the electrode wire.

In particular, stress is applied to an intermediate wire rod before an elongation process is performed as described in embodiments 2 and 4 of the present invention, so that grains having lengths, which are about two times to about ten times greater than widths thereof, are arranged in a direction substantially perpendicular to a longitudinal direction of the electrode wire. Accordingly, both the machining speed and the surface roughness can be improved.

The grains are formed through the manufacturing method in embodiments 2 and 4, so that a wire is supplied from an upper portion of a workpiece to a lower portion of the workpiece at a speed of at most 15,000 mm/min. In addition, for example, the workpiece having the thickness of about 40 mm may be machined at a machining speed of about 3 mm/min to about 4 mm/min.

The reasons for the above effects are that a plurality of grain patterns arranged in the perpendicular direction are subject to the electro-discharge machining as if multiple blades move down while smoothing the surface of a workpiece.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, the structure of an electrode wire for electro-discharge machining according to the present invention, the technical configuration in a method for manufacturing the electrode wire according to the present invention, and effects of the present invention will be described in detail with reference to FIGS. 2 to 10.

Figure 1:
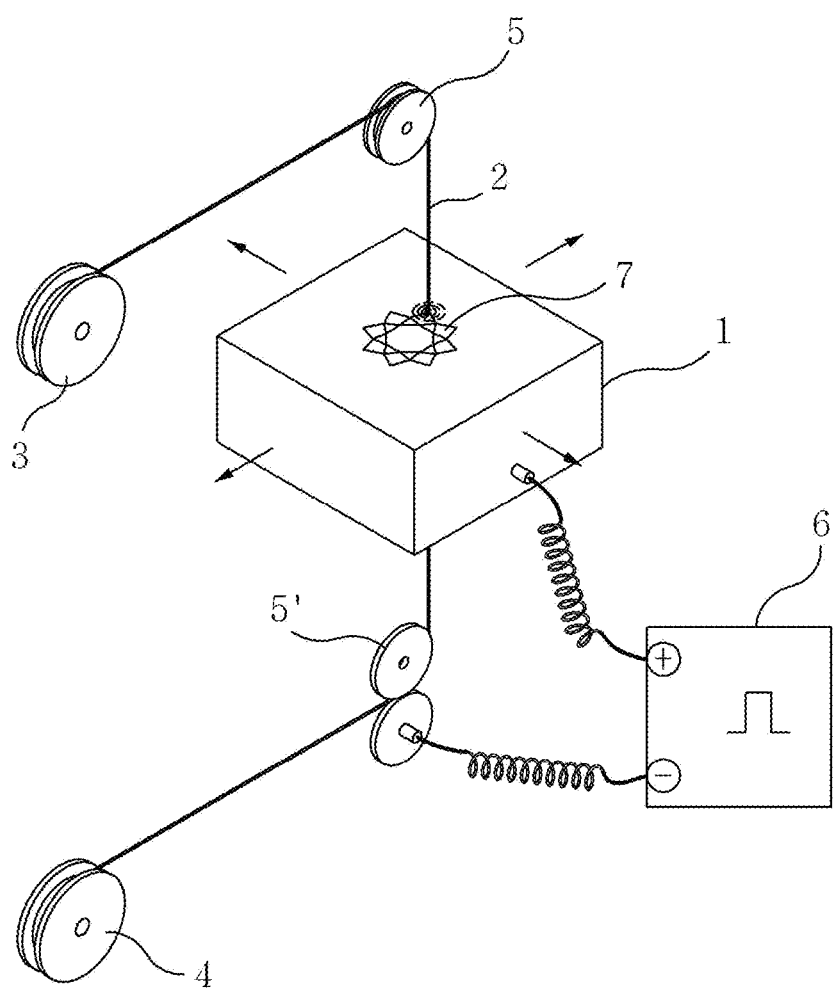
FIG. 1 is a schematic view showing the technical configuration and the principle of an electro-discharge machine according to the related art.
Figure 2:
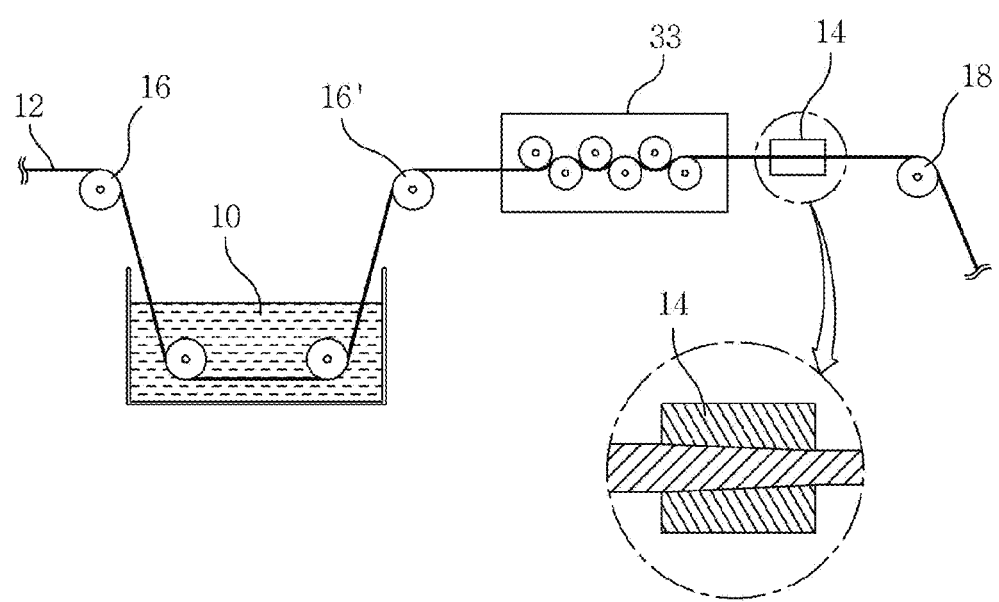
FIG. 2 is a view showing a method for manufacturing an electrode wire for electro-discharge machining according to the present invention.

Referring to FIG. 2, a core wire 12 including brass including about 65 weight % of copper and about 35 weight % of zinc is provided with a diameter in the range of about 0.9 nm to about 1.2 nm.

The core wire 12 is dipped into a plating bath 10 containing melted zinc having a vaporization temperature lower than that of brass for a predetermined time and passed through the plating bath 10, so that the melted zinc is plated on an outer portion of the core wire 12.

In particular, the entrance temperature of the plating bath 10 is adjusted to the range of about 550° C. to about 700° C., and the exit temperature of the plating bath 10 is adjusted to the range of about 420° C. to about 500° C. In addition, the core wire 12 is dipped into the plating bath 10 and passed through the plating bath 10 within time of about 1 second to about 10 seconds, thereby adjusting the tensile strength of the core wire 12 to the tensile strength of 500 N/mm$^2$ or less and adjusting the elongation percentage of about 5 or more.

In this case, the core wire 12 is provided on the interfacial surface thereof with an alloy layer representing higher hardness and the lower elongation percentage due to the diffusion reaction between zinc, which is melted in the plating bath 10, and brass when comparing with a core wire including only brass.

The core wire 12 plated with the alloy layer while being passed through the plating bath 10 under the above conditions is drawn by a drawing unit 14, so that the core wire 12 obtains a proper diameter, for example, the diameter of about 0.07 mm to about 0.35 mm.

The core wire 12 including brass, which is plated with zinc at a thickness of about 3 μm to about 10 μm through an electroplating scheme or a chemical plating scheme other than the scheme of passing the core wire 12 through the plating bath 10, may be subject to a heat treatment process at a speed of about 100 m/min to about 600 m/min under the voltage of about 10V to about 60V, so that the zinc plated core wire 12 including brass can represent the tensile strength of about 500 N/mm$^2$ or less and the elongation percentage of about 5 or more.

A copper component of the core wire 12 is diffused to the zinc plated layer to form a second alloy layer at an outer portion of a first alloy layer which is interposed between the core wire 12 and the zinc plated layer. Since the second alloy layer represents the highest hardness and the lowest tensile strength, a great amount of cracks appear on the second alloy layer due to the difference in the hardness and the elongation percentage between the second alloy layer and other layers when the second alloy layer is drawn. Accordingly, softer brass constituting the core wire 12 is erupted onto the surface of the second alloy layer as if lava and distributed onto the surface of the second alloy layer.

The mechanical properties of the fine wire can be more stabilized through the heat treatment process.

Figure 3:
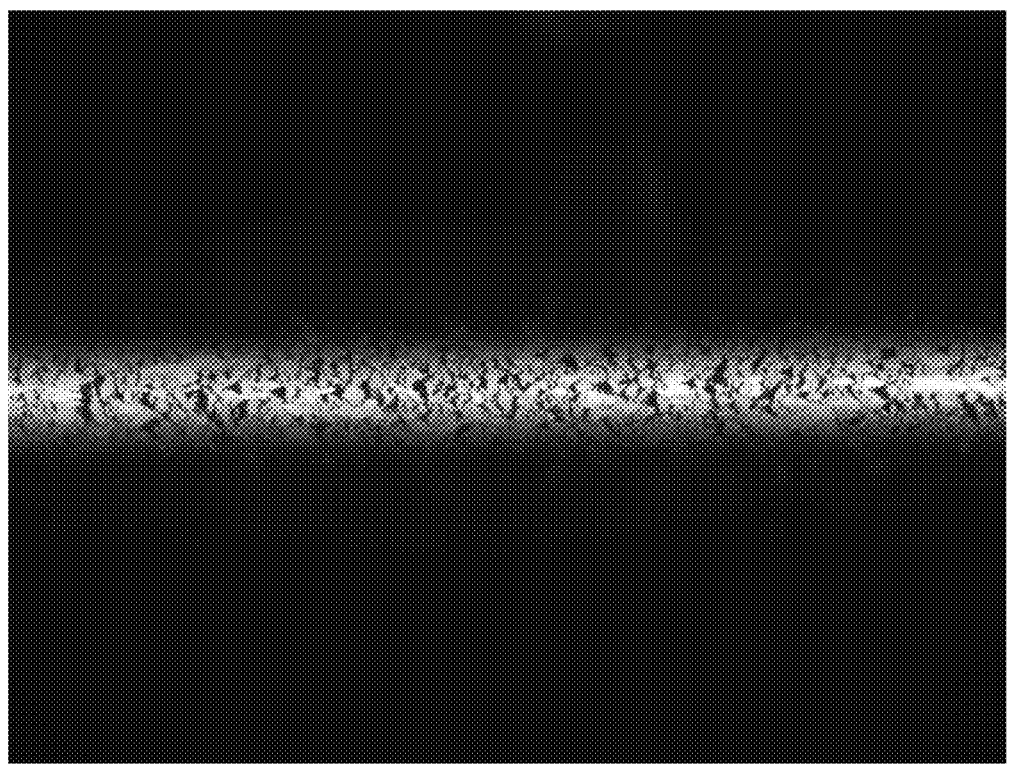
FIG. 3 is a photograph showing a product of the electrode wire for the electro-discharge machining according to a first embodiment of the present invention.
Figure 5:
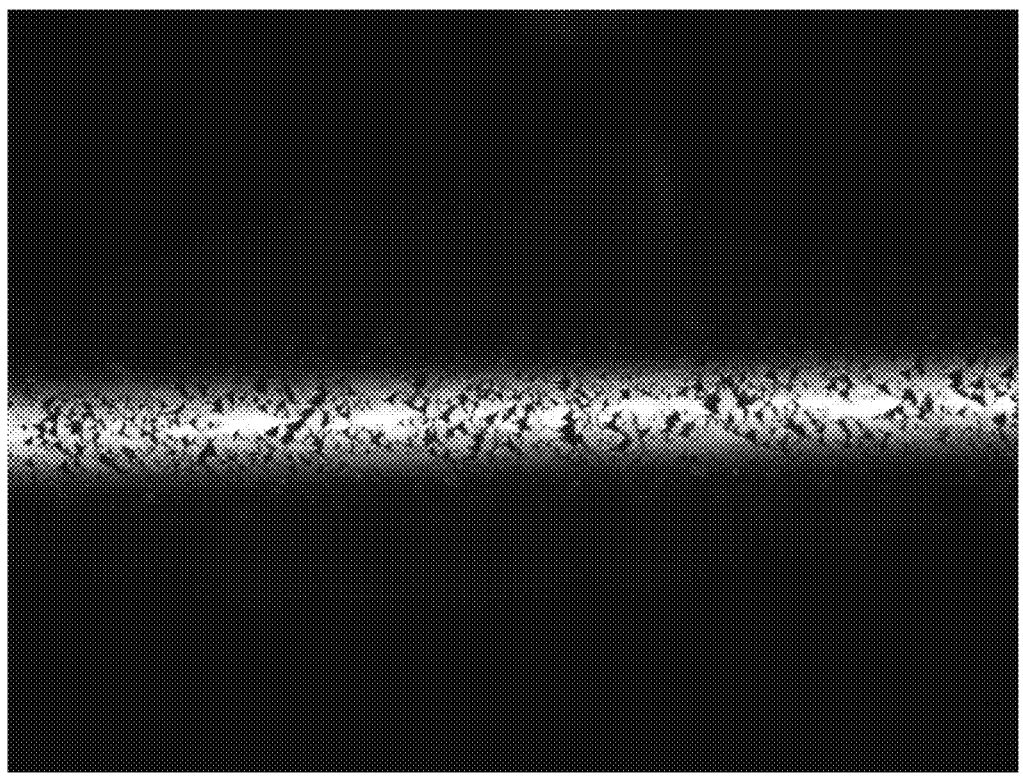
FIG. 5 is a photograph showing a product of an electrode wire for electro-discharge machining according to a third embodiment of the present invention.
Figure 9:
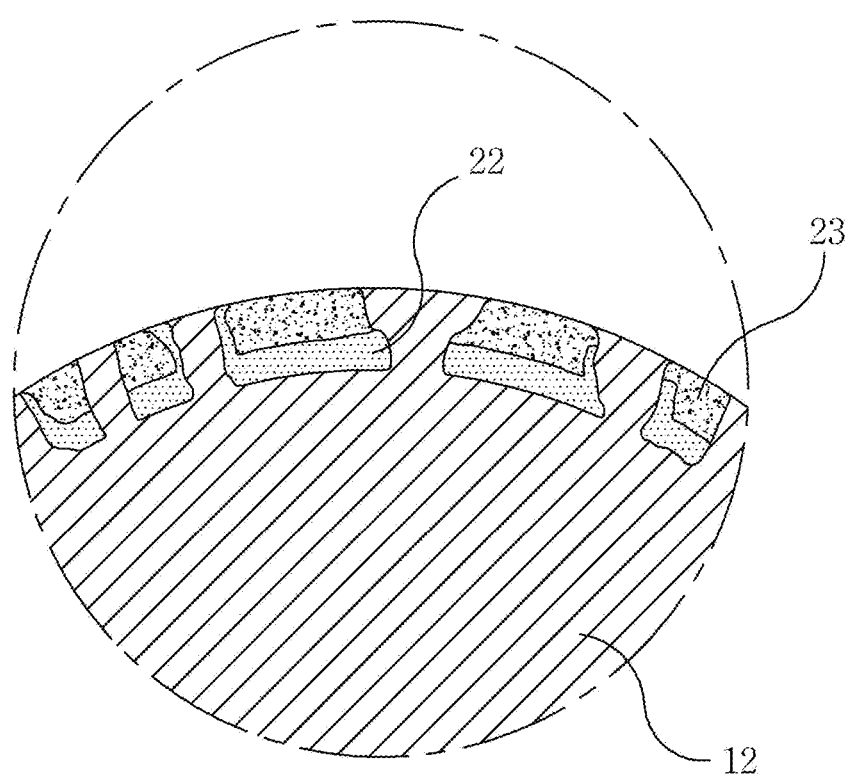
FIG. 9 is a sectional view schematically showing the product according to the first and third embodiments of the present invention.

FIGS. 3 and 5 are photographs showing the surface of the drawn electrode wire for electro-discharge machining, and FIG. 9 is a sectional view schematically showing the electrode wire for electro-discharge machining of FIGS. 3 and 5.

Referring to FIG. 9, a core wire material of brass and the alloy material are significantly distributed onto the surface of the electrode wire for the electro-discharge machining. The core wire material and the alloy material are erupted upward as if lava along cracks, so that the core wire material and alloy material are distributed on the surface of the electrode wire together with grains of the alloy layer or the alloy material is surrounded by the core wire material.

A twist unit 33 is additionally provided between a roller 16' and the drawing unit 14 to make the intermediate wire rod curved in at least one of up, down, left, and right directions, or make the intermediate wire rod twisted when drawing the core wire 12 in order to finely form the core wire 12 having the first and second alloy layers, thereby more causing cracks on the intermediate wire rod, so that softer brass is erupted onto the surface of the zinc plated layer through the cracks to form grains in a circumferential direction of the intermediate wire rod.

If stress is applied to the intermediate wire rod constituting the core wire 12 before a fine wire process is performed, grains having a long length may be arranged on the surface of the intermediate wire rod in the circumferential direction of the intermediate wire rod. The length of each grain is about twice to ten times greater than the width of the grain.

Figure 4:
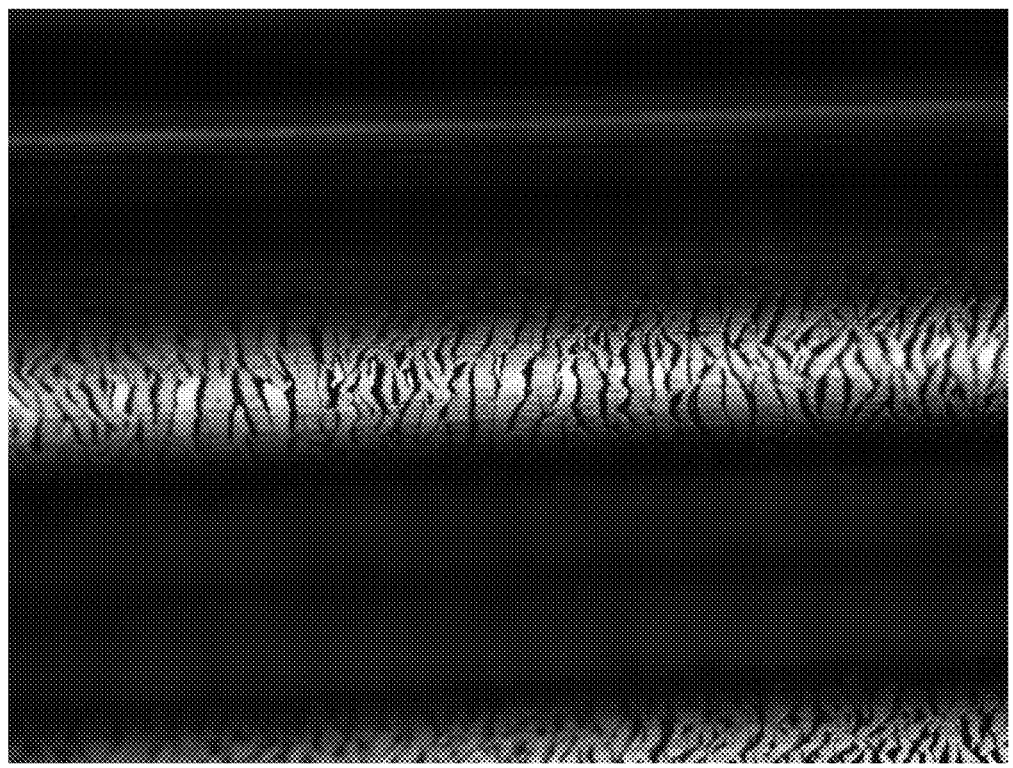
FIG. 4 is a photograph showing a product of an electrode wire for electro-discharge machining according to a second embodiment of the present invention.
Figure 6:
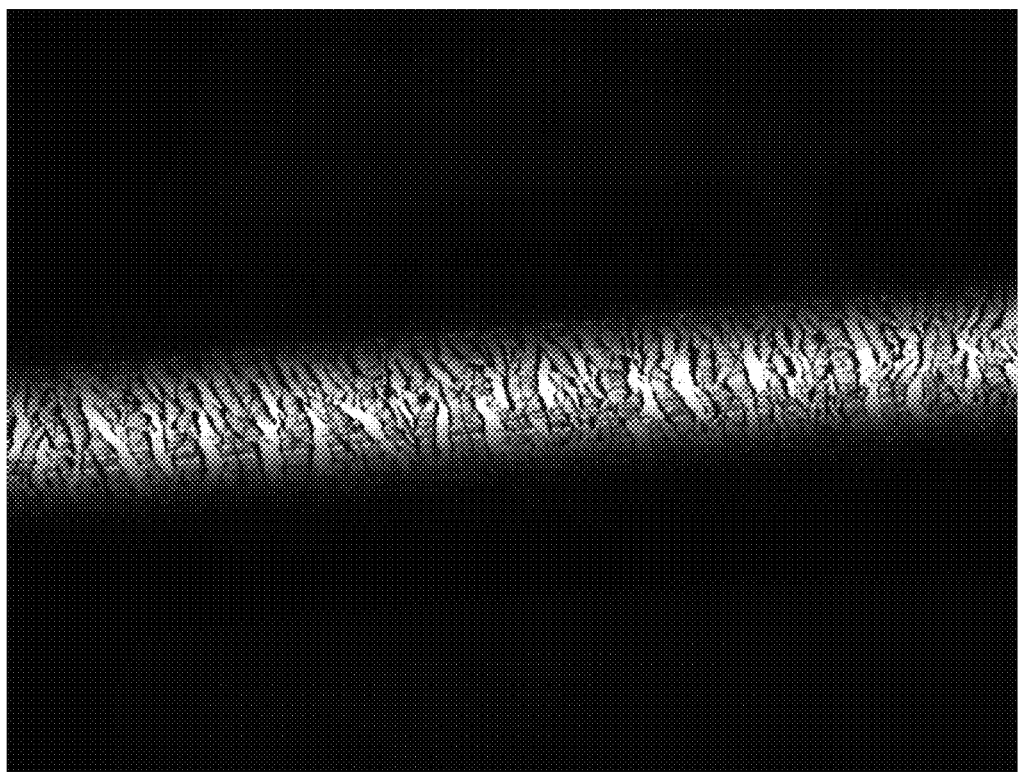
FIG. 6 is a photograph showing a product of an electrode wire for electro-discharge machining according to a fourth embodiment of the present invention.
Figure 10:
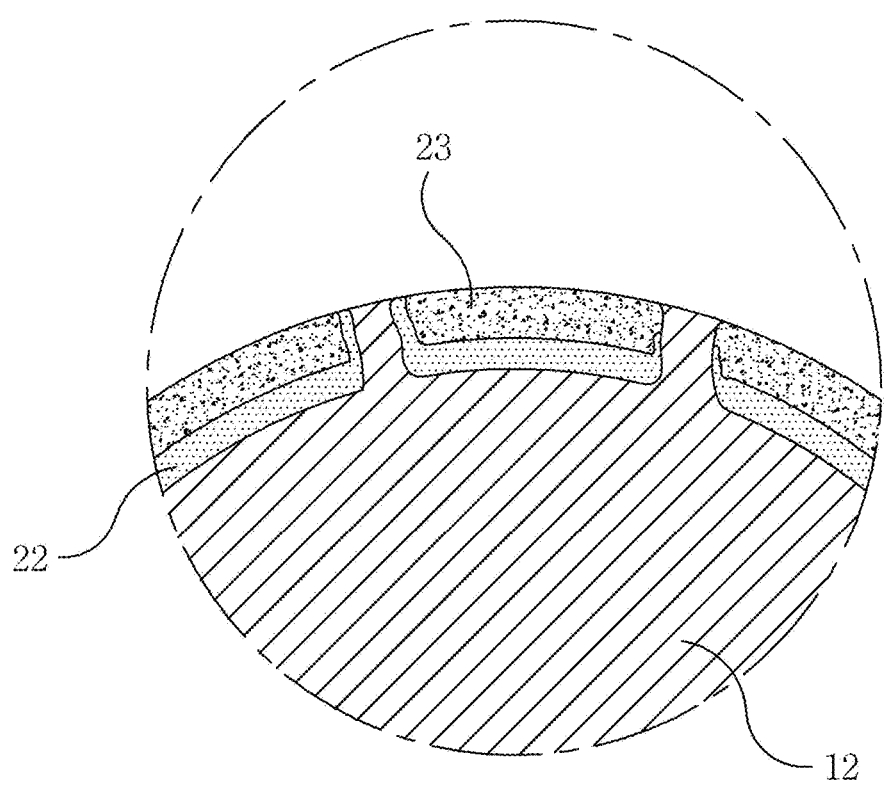
FIG. 10 is a sectional view schematically showing the product according to the second and fourth embodiments of the present invention.

FIGS. 4 and 6 are photographs showing the surface of the electrode wire for electro-discharge machining which is finely drawn after stress such as curving is applied to the intermediate wire rod for the electrode wire before the fine wire process is formed. FIG. 10 is a sectional view schematically showing the electrode wire for electro-discharge machining of FIGS. 4 and 6.

Referring to FIG. 10, a core wire material of brass is significantly distributed on the surface of the electrode wire for the electro-discharge machining, and brass grains are arranged on the surface of the electrode wire in the circumferential direction while forming a predetermined pattern.

The grains including the core wire material are greatly distributed on the surface of the electrode wire. This is because conditions of the heat treatment process for the material constituting the core wire 12 are properly adjusted, so that the tensile strength becomes about 500 N/mm$^2$ or less, and the elongation percentage becomes about 5% or more through the plating process/heat treatment process, and the intermediate wire rod is curved in a predetermined direction or stressed due to twist by the twist unit 33 before the fine wire process (elongation process) is performed.

The electrode wire for electro-discharge machining according to the present invention includes the core wire 12 including brass, the first alloy layer 22 formed at the boundary region of the core wire 12 by mutually diffusing zinc and a material of the core wire to each other, and a second alloy layer 23 formed at an outer portion of the first alloy layer 22 by diffusing the material constituting the core wire to the zinc layer.

The material constituting the core wire 12 may include metal including copper, for example, brass. The core wire 12 made of the material satisfies the conditions of the electrical conductivity and the mechanical strength required as an electrode wire. The second alloy layer 23 includes a material, such as zinc, representing a lower melting point and a lower vaporization temperature as compared with those of a material constituting the core wire 12 to protect the core wire 12 and to improve the machining speed when the electro-discharge machining is performed.

In addition, since the second alloy layer 23 has a greater amount of cracks and grains, the second alloy layer 23 can obtain a cooling speed superior to that of the conventional electrode wire. The properties of materials used in a plating process must desirably represent a lower melting point and a lower vaporization temperature as compared with those of the second alloy layer 23. The materials must be metal which is dip-plated on the metal of the core wire 12 including copper or brass and forms an alloy layer representing higher hardness through the diffusion reaction with copper in the dip-plating process. The metal includes zinc, aluminum, and tin.

Therefore, when the zinc-alloy intermediate wire rod is finely drawn to form the electrode wire for electro-discharge machining, the alloy layer may be easily cracked due to the difference in the elongation percentage between the core wire 12 and the alloy layer.

As shown in FIGS. 3 and 6, since the softer material constituting the core wire 12 softly surrounds the alloy layer representing a greater strength between the cracks, the probability of generating machining particles from the core wire and the alloy layer constituting the electrode wire is reduced in the electro-discharge machining process, In addition, by-products such as fragments of the workpiece may be absorbed and removed through the cracks between boundary regions of the grains. Accordingly, the detergency effect can be more increased when comparing with the conventional electrode wire for electro-discharge machining.

[Embodiment 1]

A core wire (including the first metal) having a diameter of about 0.9 mm, which is a brass wire (i.e., core wire including the first metal) having a compositional ratio of about 65 weight % of copper and about 35 weight % of zinc, is prepared as an intermediate wire rod.

A zinc dip-plating process is performed with respect to the core wire by using zinc which is the second metal.

The core wire used in the zinc dip-plating process is passed through an alkaline degreasing bath so that the core wire is cleaned. Then, after the core wire is subject to an acidic washing process, the core wire is cleaned again and passed through an ammonium chloride flux bath.

When the wire including the first metal that has been subject to the flux treatment is dipped into an zinc dip-plating bath of the second metal and passed through the plating bath so that the wire is plated with zinc, the intermediate wire rod for the core wire 12 is dipped into the plating bath for one second to ten seconds and passed through the plating bath in a state that the temperature of a bath entrance is maintained in the range of about 555° C. to about 700° C. which is higher than the temperature of a bath exit, and the temperature of the bath exit is maintained in the range of about 420° C. to about 500° C. which is lower than the temperature of the bath entrance, so that the intermediate wire rod is plated with zinc.

The intermediate wire rod for the core wire 12 is plated with zinc at the high temperature so that the intermediate wire rod can represent the tensile strength of about 500 N/mm$^2$ and the elongation percentage of about 5% or more.

In order to make the conditions for a soft wire, if the zinc dip-plating process is performed by dipping the core wire into the plating bath at a high temperature and passing the core wire through the plating bath, the core wire is formed on the boundary surface thereof with the first alloy layer 22 including the copper-zinc ally due to the mutual diffusion reaction with zinc when the core wire is dipped into the melted zinc and passed through the melted zinc, and the second alloy layer 23 including the zinc-copper alloy is formed on the outer portion of the first alloy layer 22 while forming a soft core wire.

The second alloy layer 23 including the zinc-copper alloy represents the highest hardness and represents the elongation percentage significantly lower than that of the soft core wire.

Through the zinc dip-plating process and the mutual diffusion reaction, the first alloy layer 22 including the copper-zinc alloy is formed at the thickness of about 1 µm to about 3 µm on the boundary surface of the core wire 12, and the second alloy layer 23 including the zinc-copper alloy is formed at the thickness of about 3 μm to about 10 μm on the outermost layer.

The first alloy layer 22 is formed due to the mutual diffusion reaction between the solid-phase core wire 12 and the liquid-phase melted zinc, and the second alloy layer 23 including zinc and copper is formed by bonding the liquid-phase melted zinc with the material of the core wire 12 including the solid-phase first metal through the mutual diffusion reaction therebetween, so that the bonding strength with the core wire can be increased.

The second alloy layer is significantly cracked when the intermediate wire rod including the first alloy layer 22, the second alloy layer 23, and the soft core wire 12 is subject to a fine wire (elongation) process, and the softer metal constituting the core wire is erupted onto the surface of the second alloy layer 23, which is provided at the outermost layer, through the gap between the cracks as if lava and distributed on the surface of the second alloy layer 23.

The intermediate wire rod including the alloy layers is drawn, so that the intermediate wire rod is formed as a fine wire having a diameter of about 0.07 mm to about 0.35 mm.

Since the second alloy layer 23 of the drawn fine wire represents higher hardness and lower elongation percentage as compared with the core wire 12, cracks significantly appear on the surface of the outermost layer corresponding to the second alloy layer 23 when the fine wire is formed through the drawing process, and the second alloy layer 23 forms an interfacial surface together with the first metal constituting the core wire 12 while interposing the first alloy layer 22 between the second alloy layer 23 and the first metal of the core wire 12.

Grains having the compositional ratio of three components of the first metal of the core wire, the metallic component of the first alloy layer including the copper-zinc alloy layer, and the metallic component of the second alloy layer including the zinc-copper alloy layer are formed on the surface of the electrode wire for electro-discharge machining that has been manufactured through the above method as shown in FIGS. 3 and 9.

The electrode wire for electro-discharge machining that has been manufactured through the fine wire process is additionally subject to a heat treatment process within 0.05 second to three seconds at the temperature of about 300° C. to about 600° C., so that the mechanical property of the core wire can be stabilized.

[Embodiment 2]

A core wire (including the first metal) having a diameter of about 0.9 mm, which is a brass wire (i.e., core wire including the first metal) having a compositional ratio of about 65 weight % of copper and about 35 weight % of zinc, is prepared as an intermediate wire rod.

A zinc dip-plating process is performed with respect to the core wire by using zinc which is the second metal.

The core wire used in the zinc dip-plating process is passed through an alkaline degreasing bath so that the core wire is cleaned. Then, after the core wire is subject to an acidic washing process, the core wire is cleaned again and passes through an ammonium chloride flux bath.

When the wire including the first metal that has been subject to the flux treatment is dipped into an zinc dip-plating bath of the second metal and passed through the plating bath so that the wire is plated with zinc, the intermediate wire rod for the core wire is dipped into the plating bath for one second to ten seconds and passed through the plating bath in a state that the temperature of a bath entrance is maintained in the range of about 555° C. to about 700° C. which is higher than the temperature of a bath exit, and the temperature of the bath exit is maintained in the range of about 420° C. to about 500° C. which is lower than the temperature of the bath entrance, so that the intermediate wire rod is plated with zinc.

The intermediate wire rod for the core wire 12 is plated with melted zinc at the high temperature so that the intermediate wire rod can represent the tensile strength of about 500 N/mm$^2$ and the elongation percentage of about 5% or more.

In order to make the conditions for a soft wire, if the zinc dip-plating process is performed by dipping the core wire into the plating bath at a high temperature and passing the core wire through the plating bath, the core wire is formed on the boundary surface thereof with the first alloy layer 22 including the copper-zinc ally due to the mutual diffusion reaction with zinc when the core wire is dipped into the melted zinc and passed through the melted zinc, and the second alloy layer 23 including the zinc-copper alloy is formed on the outer portion of the first alloy layer 22 while forming a soft core wire.

The second alloy layer 23 including the zinc-copper alloy represents the highest hardness and represents the elongation percentage significantly lower than that of the soft core wire.

Through the zinc dip-plating process and the mutual diffusion reaction, the first alloy layer 22 including the copper-zinc alloy is formed at the thickness of about 1 μm to about 3 μm on the boundary surface of the core wire 12, and the second alloy layer 23 including the zinc-copper alloy is formed at the thickness of about 3 μm to about 10 μm on the outermost layer.

The first alloy layer 22 is formed due to the mutual diffusion reaction between the solid-phase core wire 12 and the liquid-phase melted zinc, and the second alloy layer 23 including zinc and copper is formed by bonding the liquid-phase melted zinc with the material of the core wire 12 including the solid-phase first metal through the mutual diffusion reaction therebetween, so that the bonding strength with the core wire 12 can be increased.

The intermediate wire rod including the first alloy layer, the second alloy layer, and the soft core wire is passed through the twist unit 33 between the roller 16' of FIG. 2 and the drawing unit 14 before the intermediate wire rod is subject to a fine wire process (elongation process), so that the intermediate wire rod is curved in a zigzag pattern.

After the intermediate wire rod has been passed through the twist unit 33 of curving the intermediate wire rod in a zigzag pattern as described above before the intermediate wire rod is formed as the fine wire, the intermediate wire rod is formed as a fine wire having a diameter of about 0.07 mm to about 0.35 mm through a drawing process.

Figure 7:
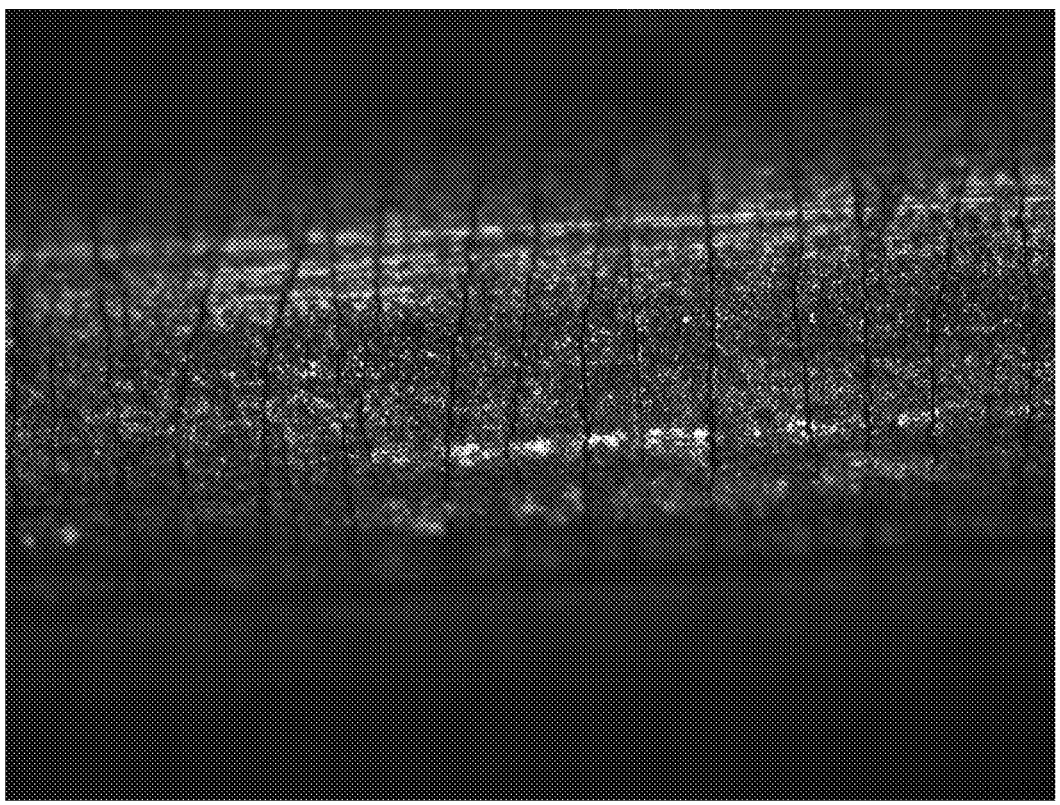
FIG. 7 is a photograph showing cracks appearing when stress is applied to an intermediate wire rod throughout the whole steps of an elongation process according to the second embodiment of the present invention.

In particular, according to the present embodiment, stress is applied to the intermediate wire rod so that the intermediate wire rod is curved in a predetermined direction before the intermediate wire rod is drawn as the fine wire. Accordingly, as shown in FIG. 7, cracks appear on the second alloy layer in a direction perpendicular to a longitudinal direction of the intermediate wire rod, and core wire metal made of soft brass is erupted onto the surface of the second alloy layer along the cracks as if lava, so that a plurality of grain groups are formed on the surface of the second alloy layer.

Core wire materials including brass are significantly distributed onto the surface of the electrode wire for electro-discharge machining through the stress process of curving the intermediate wire rod, and brass grains are arranged on the surface of the electrode wire in the circumferential direction while forming a predetermined pattern. The length of the brass grain is twice to ten times greater than the width of the brass grain.

Grain fragments having the compositional ratio of three components of the first metal of the core wire, the metallic component of the first alloy layer including the copper-zinc alloy layer, and the metallic component of the second alloy layer including the zinc-copper alloy layer are formed on the surface of the electrode wire for electro-discharge machining that has been manufactured through the above method as shown in FIGS. 4 and 10.

The electrode wire for electro-discharge machining that has been manufactured through the fine wire process is additionally subject to a heat treatment process within 0.05 second to three seconds at the temperature of about 300° C. to about 600° C., so that the mechanical property of the core wire can be stabilized.

[Embodiment 3]

A core wire (including the first metal) having a diameter of about 0.9 mm, which is a brass wire (i.e., core wire including the first metal) having a compositional ratio of about 65 weight % of copper and about 35 weight % of zinc, is prepared as an intermediate wire rod.

A zinc-electroplating process is performed with respect to the core wire by using zinc which is the second metal.

After the core wire used in the zinc-electroplating process has been passed through the alkaline cleaning bath, the core wire is subject to cleaning and acidic washing processes. Then, after the core wire is subject to the cleaning process again, the core wire is passed through a zinc-electroplating bath.

The intermediate wire rod, which has been subject to the zinc-electroplating process, is put into heat treatment machine and subject to a heat treatment process at the speed of about 155 m/min under the voltage in the range of about 50V to about 60V. Accordingly, the core wire is formed with the tensile strength of about 500 N/mm$^2$ or less and the elongation percentage of about 5% or more.

If the heat treatment process is performed after the electroplating process in order to fabricate an intermediate wire rod having the core wire satisfying the above conditions, the first alloy layer 22 including copper-zinc is formed on the boundary surface between the core wire (including the first metal) and the second metal, which is plated through the zinc-electroplating process, due the mutual diffusion reaction between the core wire and the second metal, and the second alloy layer 23 including zinc-copper is formed at the outer portion of the first alloy layer 22.

The second alloy layer including zinc-copper represents the highest hardness and represents the elongation percentage lower than that of the soft core wire.

Through the zinc-electroplating process and the mutual diffusion reaction, a first alloy layer including copper-zinc is formed at the thickness of about 1 μm to about 3 μm on the boundary surface of the core wire, and the second alloy layer including zinc-copper is formed at the thickness of about 3 μm to about 10 μm on the outer portion of the first alloy layer 23.

The first alloy layer is formed due to the mutual diffusion reaction between the first metal of the core wire and zinc (i.e., the second metal) plated in the electroplating process, and the second alloy layer is formed by diffusing the first metallic component constituting the core wire to the second metal plated in the zinc-electroplating process, so that the core wire becomes in a soft wire state representing the tensile strength of about 500 N/mm$^2$ or less and the elongation percentage of about 5% or more.

In the intermediate wire rod, which is obtained by forming the first and second alloy layers on the core wire, cracks significantly appear on the second alloy layer representing the highest hardness, and the softer metal constituting the core wire is erupted onto the surface of the second alloy layer corresponding to the outermost layer along the gap between cracks as if lava and distributed onto the surface of the second alloy layer.

The intermediate wire rod having the alloy layers is formed as a fine wire having a diameter of about 0.07 mm to about 0.35 mm through a drawing process.

Since the second alloy layer of the drawn fine wire represents the higher hardness and the lower elongation percentage, a great amount of cracks appear on the surface of the outmost layer corresponding to the second alloy layer when the fine wire is formed through the drawing process. The second alloy layer forms an interfacial surface together with the first metal while interposing the first alloy layer between the second alloy layer and the first metal.

Grain fragments having the compositional ratio of three components of the first metal of the core wire, the metallic component of the first alloy layer including the copper-zinc alloy layer, and the metallic component of the second alloy layer including the zinc-copper alloy layer are formed on the surface of the electrode wire for electro-discharge machining that has been manufactured through the above method as shown in FIGS. 5 and 9.

The electrode wire for electro-discharge machining that has been manufactured through the fine wire process is additionally subject to a heat treatment process within 0.05 second to three seconds at the temperature of about 300° C. to about 600° C., so that the mechanical property of the core wire can be stabilized.

[Embodiment 4]

A core wire (including the first metal) having a diameter of about 0.9 mm, which is a brass wire (i.e., core wire including the first metal) having a compositional ratio of about 65 weight % of copper and about 35 weight % of zinc, is prepared as an intermediate wire rod.

A zinc-electroplating process is performed with respect to the core wire by using zinc which is the second metal.

After the core wire used in the zinc-electroplating process has been passed through the alkaline cleaning bath, the core wire is subject to cleaning and acidic washing processes. Then, after the core wire is subject to the cleaning process again, the core wire is passed through a zinc-electroplating bath.

The intermediate wire rod, which has been subject to the zinc-electroplating process, is put into heat treatment machine and subject to a heat treatment process at the speed of about 155 m/min under the voltage in the range of about 50V to about 60V. Accordingly, the core wire is formed with the tensile strength of about 500 N/mm$^2$ or less and the elongation percentage of about 5% or more.

If the heat treatment process is performed after the electroplating process in order to fabricate an intermediate wire rod satisfying the above conditions, the first alloy layer 22 including copper-zinc is formed on the boundary surface between the core wire (including the first metal) and the second metal, which is plated through the zinc-electroplating process, due the mutual diffusion reaction between the core wire and the second metal, and the second alloy layer 23 including zinc-copper is formed at the outer portion of the first alloy layer 22.

The first alloy layer is formed due to the mutual diffusion reaction between the first metal of the core wire and zinc (i.e., the second metal) plated in the electroplating process, and the second alloy layer is formed by diffusing the first metallic component of the core wire to the second metal used in the zinc-electroplating process, so that the core wire becomes in a soft wire state representing the tensile strength of about 500 N/mm² or less and the elongation percentage of about 5% or more.

The second alloy layer including zinc-copper represents the highest hardness and represents the elongation percentage lower than that of the soft core wire.

Through the heat treatment process after the electroplating process, the first alloy layer including the alloy of copper-zinc is formed at the thickness of about 1 μm to about 3 μm on the boundary surface of the core wire, and the second alloy layer including the zinc-copper alloy is formed at the thickness of about 3 μm to about 10 μm on the outermost layer.

The intermediate wire rod including the first alloy layer, the second alloy layer, and the soft core wire is passed through the twist unit 33 between the roller 16' of FIG. 2 and the drawing unit 14 before the intermediate wire rod is subject to a fine wire process (elongation process), so that the intermediate wire rod is curved in a zigzag pattern.

After the intermediate wire rod has been passed through the twist unit 33 of curving the intermediate wire rod in a zigzag pattern before the intermediate wire rod is formed as a fine wire, the intermediate wire rod is formed as a fine wire having a diameter of about 0.07 mm to about 0.35 mm through a drawing process.

Figure 8:
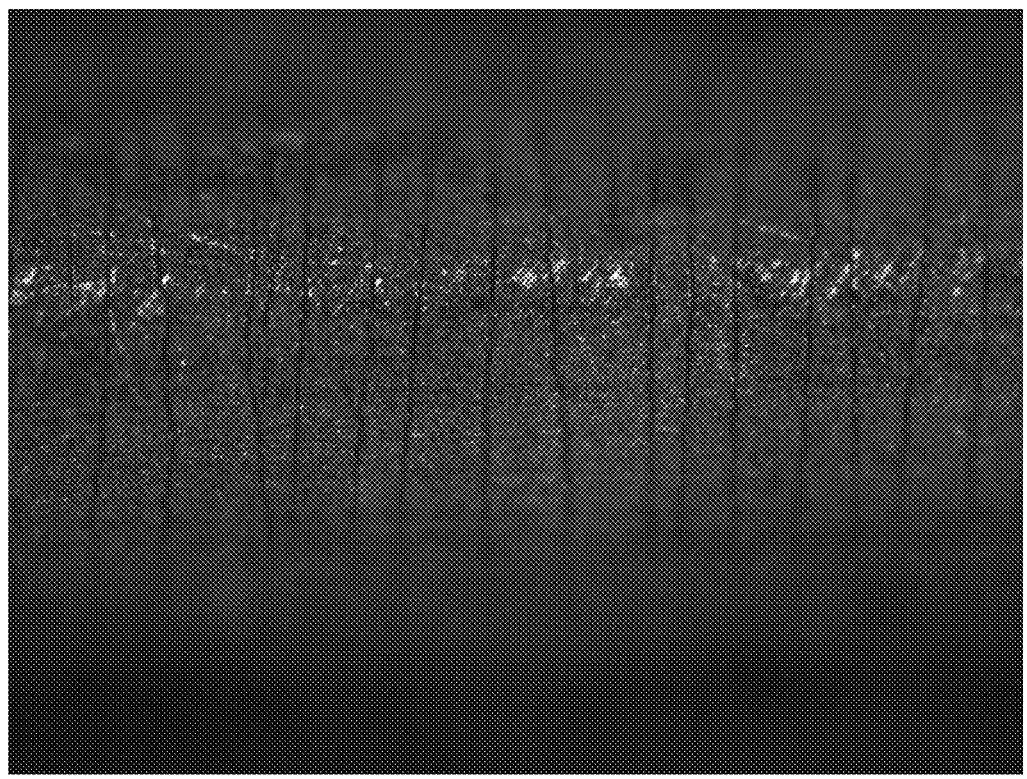
FIG. 8 is a photograph showing cracks appearing when stress is applied to an intermediate wire rod throughout the whole steps of an elongation process according to the fourth embodiment of the present invention.

In particular, according to the present embodiment, stress is applied to the intermediate wire rod so that the intermediate wire rod is curved in a predetermined direction before the intermediate wire rod is drawn as the fine wire. Accordingly, as shown in FIG. 8, cracks additionally appear on the second alloy layer in a direction perpendicular to a longitudinal direction of the intermediate wire rod, and core wire metal made of soft brass is erupted onto the surface of the second alloy layer through the cracks as if lava, so that a plurality of grain groups are formed on the surface of the second alloy layer.

Core wire materials including brass are significantly distributed onto the surface of the electrode wire for electro-discharge machining due to the stress process of curving the intermediate wire rod, and brass grains are arranged on the surface of the electrode wire in the circumferential direction while forming a predetermined pattern. The length of the brass grain is twice to ten times greater than the width of the brass grain.

Grain having the compositional ratio of three components of the first metal of the core wire, the metallic component of the first alloy layer including the copper-zinc alloy layer, and the metallic component of the second alloy layer including the zinc-copper alloy layer are formed on the surface of the electrode wire for electro-discharge machining that has been manufactured through the above method as shown in FIGS. 6 and 10.

The electrode wire for electro-discharge machining that has been manufactured through the fine wire process is additionally subject to a heat treatment process within 0.05 second to three seconds at the temperature of about 300° C. to about 600° C., so that the mechanical property of the core wire can be stabilized.

As described above, according to the embodiments, since grains, which surround the second alloy layer, are formed by erupting the softer core wire upward onto the surface of the electrode wire through the cracks and exposing the core wire onto the surface of the electrode wire, a small amount of machining particles are derived from the electrode wire. In addition, since the second alloy layer having a vaporization temperature lower than that of the first metal increases instantaneous vaporization power of thermal energy in discharging, the manufacturing speed is increased, and the surface roughness of the workpiece and the manufacturing speed are maximized in the electro-discharging process.

The embodiments have been described in terms of the electroplating process and the dip-plating process. However, even if a heat treatment process may be performed after a chemical plating scheme has been performed, the same effects can be made.

The first metal may include copper or the alloy of copper other than brass, and the second metal may include zinc, aluminum, tin, or the alloy thereof.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An electrode wire for electro-discharge machining, the electrode wire comprising:
    a core wire including a first metal, the core wire having a smooth surface;
    a first alloy layer formed at a boundary region between the core wire and a second metal plated on an outer surface of the core wire due to mutual diffusion between the core wire and the second metal; and
    a second alloy layer formed at an outer portion of the first alloy layer due to diffusion of the first metal to the second metal, the second alloy layer having a plurality of cracks therein, the plurality of cracks being formed by twisting the wire with a plurality of rollers,
    wherein a core wire material is erupted onto a surface of the electrode wire for electro-discharge machining, which includes at least the core wire, the first alloy layer, and the second alloy layer, along the cracks appearing on the second alloy layer, so that a plurality of grains are formed on the surface of the electrode wire, a length of a grain in the circumferential direction being more than twice a width of the grain, and
    wherein the grain including at least the core wire material and a second alloy material is distributed onto the surface of the electrode wire for electro-discharge machining.

2. The electrode wire of claim 1, wherein the core wire material is erupted together with a first alloy material, so that the grain including the core wire material, the first alloy material, and the second alloy material is distributed on the surface of the electrode wire for electro-discharge machining.

3. The electrode wire of claim 2, wherein the first metal includes one selected from the group consisting of copper, brass, and a copper alloy, and the second metal includes one selected from the group consisting of zinc, aluminum, tin, and an alloy thereof.

4. The electrode wire of claim 2, wherein the grain including at least the second alloy material is surrounded by the core wire material.

5. The electrode wire of claim 2, wherein the grain including the core wire material is arranged in a direction substantially perpendicular to a longitudinal direction of the electrode wire for electro-discharge machining, and has a length twice or ten times greater than a width of the grain.

6. The electrode wire of claim 1, wherein the first metal includes one selected from the group consisting of copper, brass, and a copper alloy, and the second metal includes one selected from the group consisting of zinc, aluminum, tin, and an alloy thereof.

7. The electrode wire of claim 1, wherein the grain including at least the second alloy material is surrounded by the core wire material.

8. The electrode wire of claim 1, wherein the grain including the core wire material is arranged in a direction substantially perpendicular to a longitudinal direction of the electrode wire for electro-discharge machining, and has a length twice or ten times greater than a width of the grain.

9. A method of manufacturing an electrode wire for electro-discharge machining, the method comprising:
   preparing an intermediate wire rod, which includes a first metal and has a first diameter, as a core wire;
   plating the core wire with a second metal;
   performing a heat treatment process to make the plated core wire representing tensile strength of about 500 N/mm$^2$ or less and elongation percentage of 5 or more and to form a first alloy layer in at least a boundary region between the core wire and the second metal due to mutual diffusion between the core wire and the second metal and to form a second alloy layer on an outer portion of the first alloy layer through diffusion of the first metal to the second metal;
   forcibly twisting the electrode wire between a plurality of rollers in at least one of up, down, left, and right directions; and
   forming a grain including at least a core wire material and a second alloy material on a surface of the electrode wire for electro-discharge machining by erupting the core wire material through a crack appearing on the second alloy layer when performing a fine wire process of making the electrode wire for electro-discharge machining which includes the first alloy layer, the second alloy layer, and the core wire and has a second diameter.

10. The method of claim 9, wherein, in the forming of the grain on the surface of the electrode wire for electro-discharge machining, the core wire material is erupted together with a first alloy material, so that the grain including the core wire material, the first alloy material, and the second alloy material is formed.

11. The method of claim 10, wherein the core wire is plated with the second metal through one of an electroplating scheme, a dip-plating scheme, and a chemical plating scheme.

12. The method of claim 10, wherein the first metal includes one selected from the group consisting of copper, brass, and a copper alloy, and the second metal includes one selected from the group consisting of zinc, aluminum, tin, and an alloy thereof.

13. The method of claim 9, wherein the core wire is plated with the second metal through one of an electroplating scheme, a dip-plating scheme, and a chemical plating scheme.

14. The method of claim 13, wherein the core wire is plated with the second metal through the dip-plating scheme, and the heat treatment process is performed by dipping the core wire into a plating bath having an entrance temperature of about 550° C. to about 700° C. and an exit temperature of about 420° C. to about 500° C. within time of about 1 second to about 10 seconds.

15. The method of claim 9, wherein the first metal includes one selected from the group consisting of copper, brass, and a copper alloy, and the second metal includes one selected from the group consisting of zinc, aluminum, tin, and an alloy thereof.

* * * * *